Jan. 16, 1934.  W. R. HUME  1,943,867
FLUX COATED WELDING ROD AND MEANS THEREFOR
Filed April 20, 1931
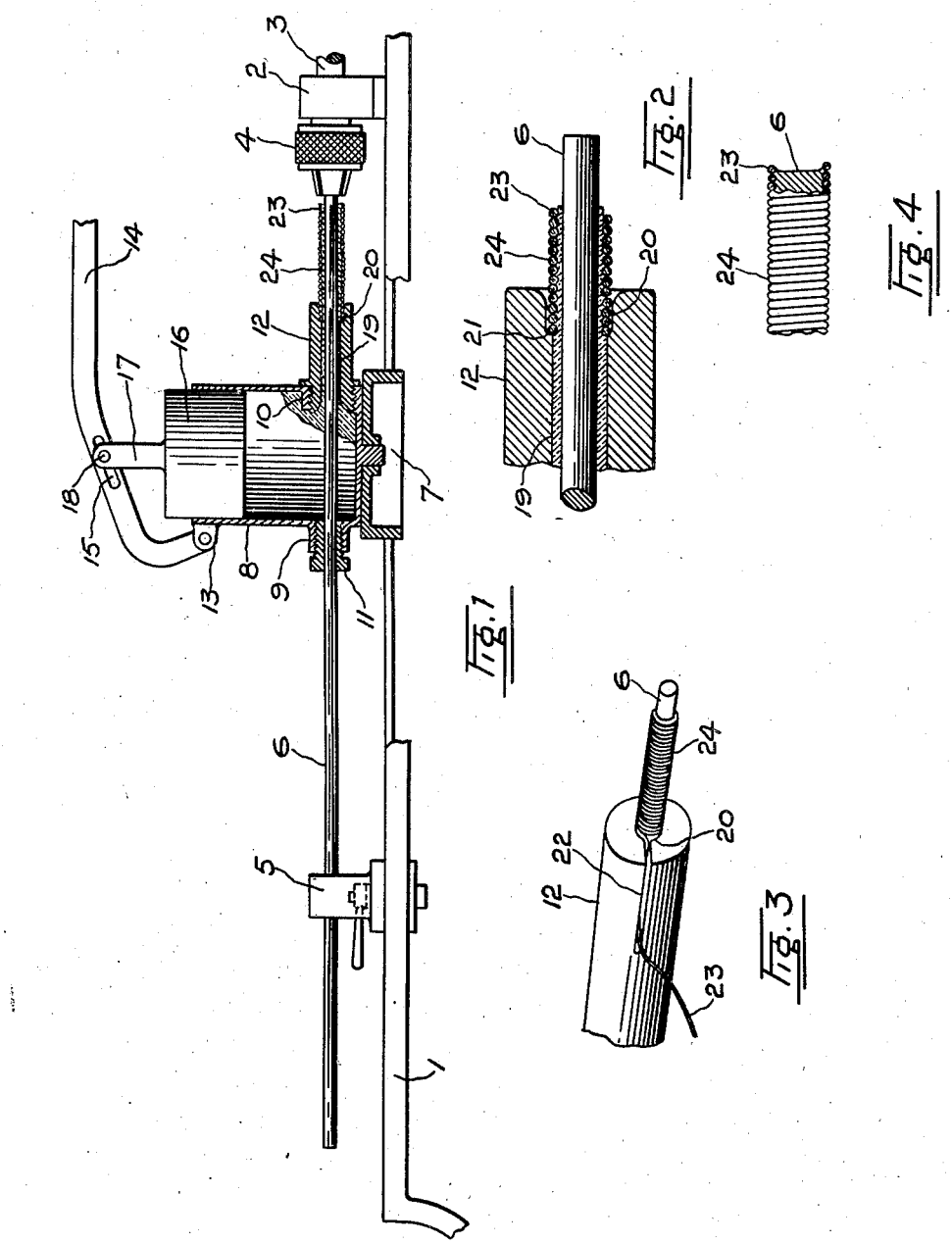
INVENTOR
WALTER REGINALD HUME
BY Featherstonhaugh & Co
ATTORNEYS Patented Jan. 16, 1934

1,943,867

UNITED STATES PATENT OFFICE 1,943,867

FLUX COATED WELDING ROD AND MEANS THEREFOR

Walter Reginald Hume, Melbourne, Victoria, Australia

Application April 20, 1931. Serial No. 531,505

4 Claims. (Cl. 219—8)

My invention relates to improvements in flux coated welding rods and means therefor. The objects of the invention are to coat a welding rod or electrode with a flux capable of alloy with the metal of the rod in such a manner as to produce an even burning and consequently a uniform heat at the arcing point of the rod when welding; to form a covering of slag over the weld whereby oxidization is reduced materially and the heat is maintained at the weld for a considerably greater period than now prevails in welds made with the regular type of rod. A further object is to provide a covering which will induce a suitable electric condition over the entire arcing area. A still further object is to provide a simple mechanical device for coating the rods.

The coating device consists essentially of a chuck for rotatably supporting a welding rod, a flux cylinder through which the rod is adapted to pass, means for forcing flux from the cylinder onto the rod surface and means for binding the rod and the flux surface, as will be more fully described in the following specification and shown in the accompanying drawing, in which:—

Fig. 1 is a general view of the apparatus.

Fig. 2 is an enlarged sectional view of the die showing the welding rod in process of being coated.

Fig. 3 is a perspective view of the outer end of the die showing the cord feed slot.

Fig. 4 is a view showing the normal arcing face of a rod coated and closely wrapped.

In the drawing like characters of reference indicate corresponding parts in each figure.

The numeral 1 indicates a pair of guides having at one end a standard 2 in which a driven shaft 3 is rotatably journalled. On the shaft 3 a chuck 4 of any suitable type is mounted and aligned with the chuck adjacent the opposite end of the guides 1 is a slidably mounted back rest 5 in which the outer end of a welding rod 6 is releasably journalled during the coating process. A base 7 is slidably mounted upon the guides 1 which pivotally supports a cylinder 8.

The cylinder 8 is provided with opposed bosses 9 and 10 adjacent its base, the boss 9 being fitted with an interchangeable bushing 11 which is adapted to fit the rod to be coated and the boss 10 being fitted with an interchangeable die 12. The cylinder 8 is provided with a lug 13 and in this lug a lever 14 is fulcrumed which is slotted intermediate its length as at 15, the cylinder is provided with a plunger 16 having an upstanding rod 17 connected by a pin 18 to the lever 14. The die 12 is a tubular member having concentric bores 19 and 20 and an intervening internal shoulder 21.

The bore 19 is of a diameter somewhat greater than the rod and its flux coating, the bore 20 is of a diameter equal to the rod, its coating and its cord wrapping. A slot 22 is formed in one side of the die 12 and extends inwardly from its outer end through to the shoulder 21 to form a lead in or feed slot to the cord 23 with which the rod is wrapped as at 24.

Where small diameter rods are to be coated the cylinder 8 and its associated parts including the die 12 may be of such small dimensions as to be conveniently supported by hand, thus avoiding the necessity of mounting the cylinder upon a sliding base such as that indicated by the numeral 7.

In operation the cylinder 8 is moved rearwardly towards the back rest 5 and a welding rod 6 is inserted through the die 12 and the bushing 11, and its forward end entered and secured in the chuck 4. If the rod is of such length as to cause whipping at its free end at the commencement of the coating process the back rest 5 is moved forwardly to support and journal it. The cylinder 8 having been filled with a suitable flux in paste or powder form and the plunger 16 put into position thereover, the shaft 3 is rotated by any suitable means and force is exerted upon the free end of the lever 14. Simultaneously a cotton cord or other suitable combustible material 23 is fed through the slot 22 and onto the rotating rod 6. The pressure exerted upon the plunger forces the flux from the cylinder through the bore 19 of the die 12 where it is pressed into intimate contact with the surface of the rod in an even film of predetermined thickness and as the coated portion reaches the bore 20 it is wrapped tightly with the cotton cord 23. The cord bears against the shoulder 21 so that the resistance of the cylinder to endwise movement causes the several windings to be laid in close contact with each other as shown in Figures 1, 2, 3 and 4. The diameter of the bore 20 is somewhat restricted so as to press the cord into the outer surface of the film of flux applied during the passage of the rod through the bore 19. By thus pressing the cord into the film the flux is compacted and forms a heat resisting coating preventing the cotton from burning off the rod too readily due to the heat of the arc.

When the rod is wrapped throughout its effective length it is detached from the chuck 4, the cylinder 8 is rotated about its vertical axis, the pressure is removed from the plunger 16 and the rod is withdrawn therefrom, subsequently the cord is coated by rubbing with an amount of flux in paste form and then allowed to dry. After the rods are thoroughly dried they are dipped in a solution of silicate of soda and dried again, when they are ready for use. Rods of large diameter would preferably be put through the die a second time to apply a further flux coating and a second wrapping, subsequently being treated as above described.

In use the closely wrapped welding rod enables the arcing area to remain substantially flat and at right angles to the longitudinal axis of the rod since the rod, due to its close wrapping, is substantially insulated against external temperature and the arc can exert a similar burning effort over the entire area.

What I claim as my invention is:

1. The method of coating a weld rod which consists in rotating the rod, extruding an annular body of flux coating material lengthwise onto the rod during such rotation, and simultaneously winding a combustible cord onto said flux coating.

2. A method according to claim 1 wherein the convolutions of the cord winding are pressed inwardly into the flux coating during rotation of the weld rod.

3. A method according to claim 1 wherein the convolutions of the cord are pressed longitudinally into close contact with each other by endwise pressure exerted thereon as the cord is being wound onto the flux coating material.

4. A method according to claim 1 wherein the flux coating material is applied in the form of a paste and is forced lengthwise of the rod and into which the combustible cord is pressed.

WALTER REGINALD HUME.